United States Patent [19]
Keller

[11] Patent Number: 4,460,216
[45] Date of Patent: Jul. 17, 1984

[54] DEEP-SEA FISHERMAN'S CHAIR

[76] Inventor: Rogenald J. Keller, 204 N. Minnesota Ave., St. Peter, Minn. 56082

[21] Appl. No.: 318,334

[22] Filed: Nov. 5, 1981

[51] Int. Cl.³ .......................... A47C 3/18; A47C 7/62; B63B 29/00
[52] U.S. Cl. .................................. 297/217; 297/349; 248/416
[58] Field of Search ............... 297/217, 243, 349, 423; 248/416

[56] References Cited

U.S. PATENT DOCUMENTS

| | | | |
|---|---|---|---|
| 1,082,423 | 12/1913 | Hartman | 297/243 X |
| 1,223,884 | 4/1917 | Johnstone | 297/217 X |
| 2,865,429 | 12/1958 | Thompson | 297/349 |
| 3,039,553 | 10/1958 | Van Der Lely et al. | 180/77 |
| 3,151,910 | 10/1964 | Larson | 297/349 |
| 3,528,304 | 9/1970 | Hopkins | 74/89.21 |
| 3,542,424 | 11/1970 | Bingley et al. | 297/349 |
| 3,598,947 | 8/1971 | Osborn | 200/86.5 |
| 3,708,203 | 1/1973 | Barecki et al. | 297/349 |
| 3,727,873 | 4/1973 | Hill | 248/418 |
| 3,851,916 | 12/1974 | Quartullo | 297/217 X |
| 3,960,406 | 6/1976 | Buker | 297/345 |
| 4,008,500 | 2/1977 | Hall, Jr. | 297/349 X |
| 4,086,676 | 5/1978 | Arruza | |
| 4,181,281 | 1/1980 | Kosak | 248/416 |
| 4,262,958 | 4/1981 | Houseman et al. | 297/349 X |
| 4,278,289 | 7/1981 | Esposito | |

FOREIGN PATENT DOCUMENTS 368152  9/1906  France .............................. 297/349

Primary Examiner—William E. Lyddane
Assistant Examiner—Peter R. Brown
Attorney, Agent, or Firm—Schroeder, Siegfried, Vidas & Arrett

[57] ABSTRACT

A deep-sea fisherman's chair comprising seat structure mounted for pivotal movement about a vertical axis located preferably forwardly of the forward edge of the seat and having a fishing-pole socket in the form of a gimbal preferably located between the axis of pivot of the seat and its forward edge.

7 Claims, 7 Drawing Figures

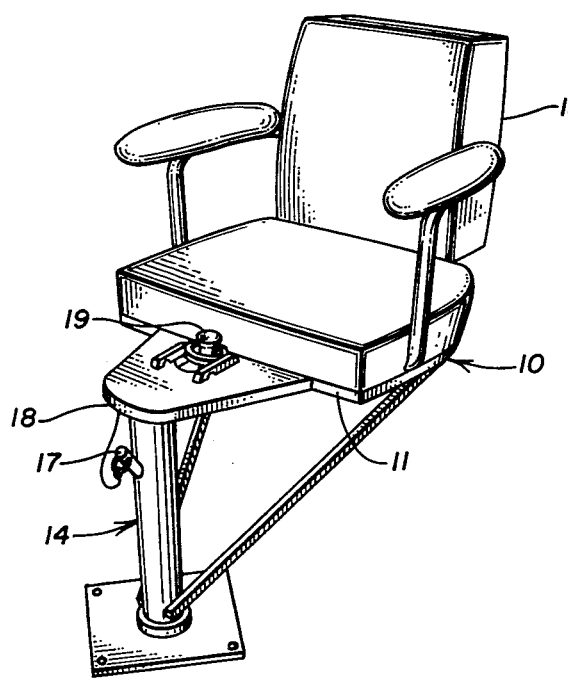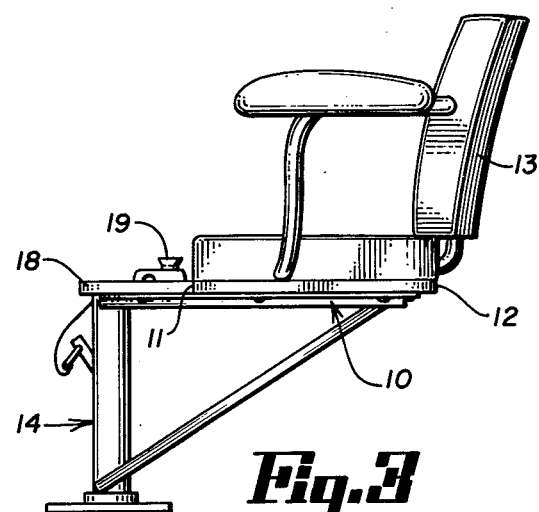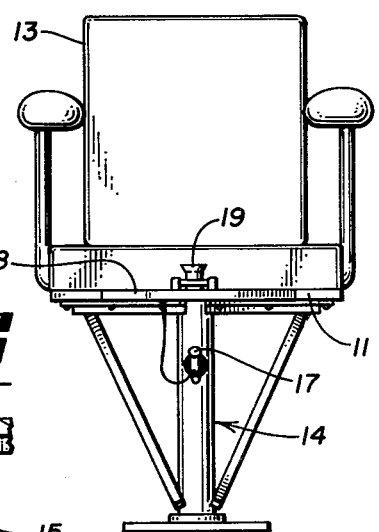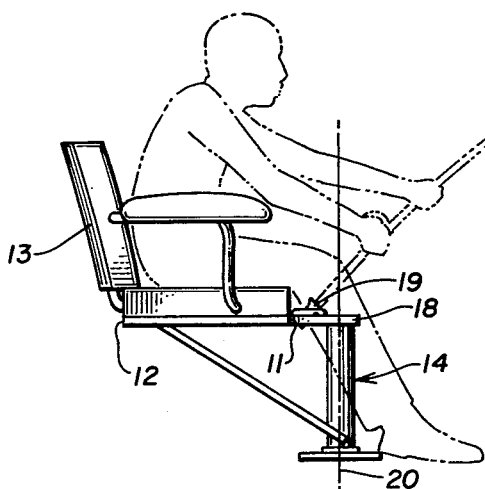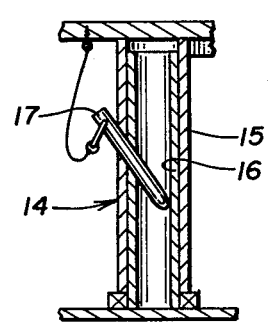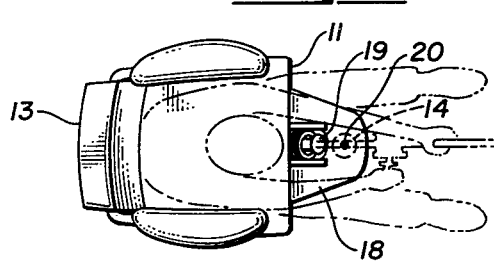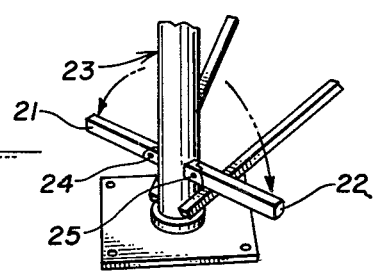

DEEP-SEA FISHERMAN'S CHAIR

DESCRIPTION

BACKGROUND OF THE PRIOR ART

Deep-sea fisherman's chairs have heretofore conventionally been mounted for pivotal movement about a vertical axis disposed beneath the seat of the chair with the fish-pole receiving socket mounted on the chair forwardly of its axis of pivot. Such structure causes the forces applied to the seat by the pole through the gimbal to be transferred into a rotative force upon the chair in a direction opposite to that in which the fish is pulling. As a consequence, the fisherman must overcome that force, in addition to maintaining the rod or pole in an upright position. My invention is directed to obviating the former.

BRIEF SUMMARY OF THE INVENTION

My deep-sea fisherman's chair is constructed so as to cause the forces exerted by the fish upon the rod to urge the chair to a position where it faces the location of the fish rather than away from same. I accomplish this desirable result by mounting the rod-holding gimbal between the backside of the chair and its axis of pivot, and preferably, between the axis of pivot and the front side of the chair. In addition, I provide simple and easy to use means for locking the chair against rotation if and when desired, and also foot anchors pivotable to an out-of way position along the axis of pivot.

BRIEF DESCRIPTION OF THE DRAWINGS

A detailed description of one preferred embodiment of the Fisherman's Chair is hereafter described with specific reference being made to the drawings in which:

FIG. 1 is a perspective view of the preferred form of my invention;

FIG. 2 is a side elevational view thereof;

FIG. 3 is a front elevational view thereof;

FIG. 4 is an opposite side elevational view thereof with a fisherman and his rod shown in phantom;

FIG. 5 is a top plan view thereof with a fisherman and his rod shown in phantom;

FIG. 6 is a fragmentary vertical section view of the pivot structure thereof; and FIG. 7 is a fragmentary perspective view showing the lower portion of the pivot structure of a second embodiment of my invention.

DETAILED DESCRIPTION OF THE INVENTION

The preferred embodiment of my invention is shown in FIGS. 1-6, inclusive, and includes a seat 10 which has a forward side 11 and a rearward side 12 and includes back structure 13. Pivot structure 14 supports seat 10 and is comprised of a depending tube 15 which telescopically receives and pivots about fixed upright interior tube 16. Matching downwardly inclined openings in each of said tubes receiving locking pin 17 therein.

Plate 18 is fixedly secured at its forward end to the upper end of tube 15 and at its rearward end to the forward side 11 of seat 10 to provide a generally horizontal support therefor.

A rod holder or socket 19 in the form of a gimbal is mounted upon plate 18, between the axis of pivot 20 of the pivot structure 14 and the forward side 11 of the seat, to enable a fisherman, such as shown in phantom in FIG. 4, to secure the inner end of his rod therein.

FIG. 7 shows a pair of foot anchors 21 and 22, pivotally mounted upon the lower end of similar pivot structure 23 to enable the fisherman to anchor his feet thereupon. When not in use, they may be swung upwardly about transverse axes 24 and 25, respectively, to parallel along-side positions relative to their supporting pivot structure 23.

In use, the inner end of the fisherman's rod is inserted in socket 19 and pin 17 is withdrawn. The force of the rod is thereby transmitted to seat 10 in a direction such that seat 10 faces toward the fish, rather than away therefrom. As a consequence, the effort which is required by the fisherman is substantially reduced and he is much more comfortable in that he faces directly toward the fish and is not required to overcome the heretofore natural tendency of fisherman's chairs to be urged by the force exerted thereupon by the rod to face away from the fish. My chair, therefore, is much more comfortable and substantially less tiring for the fisherman.

As indicated previously, if the chair is to be used merely for relaxation purposes and it is desired to fix the same against unwanted pivotal movement, this may be accomplished by insertion of pin 17, as shown in FIG. 6.

Also, for occasions where an unusually large fish is caught, the need for an anchor for his feet can be met by swinging the foot rests 21 and 22 downwardly to the position shown in FIG. 7.

In considering this invention, it should be remembered that the present disclosure is illustrative only and the scope of the invention should be determined by the appended claims.

I claim:

1. A deep-sea fisherman's chair comprising:
   (a) seat structure for supporting a fisherman while fishing and having a forward and rearward side;
   (b) upright pivot structure supporting said seat structure for pivotal movement about a vertically extending axis, said pivot structure being constructed and arranged such that said pivot is forward of said rearward side; and
   (c) a fishing-pole socket pivotable about at least one generally horizontal axis and supported by said pivot structure at a point located between said pivotal axis of said seat structure and said rearward side of said seat structure.

2. The structure defined in claim 1 wherein said fishing-pole socket is located between said forward side of said seat structure and said axis of pivot of said pivot structure.

3. The structure defined in claim 1 wherein said fishing-pole socket is a gimbal.

4. The structure defined in claim 2 wherein said fishing-pole socket is a gimbal.

5. The structure defined in claim 1 wherein said pivot structure includes a horizontally extending support member extending from adjacent the axis of pivot thereof to the forward side of said seat structure and said fishing-pole socket is mounted on said support member.

6. The structure defined in claim 5 wherein said fishing-pole socket is a gimbal mounted on said support member between the forward side of said seat member and the axis of pivot of said pivot structure.

7. The structure defined in claim 5 wherein said support member is a generally horizontally extending plate.

* * * * *